US012554437B2

(12) United States Patent
Peng et al.

(10) Patent No.: US 12,554,437 B2
(45) Date of Patent: Feb. 17, 2026

(54) CREATING THICK-PROVISIONED VOLUME ACCORDING TO A QUALITY OF SERVICE POLICY BASED ON THE WORKLOAD OF A CLUSTER

(71) Applicant: Inspur Electronic Information Industry Co., Ltd, Jinan (CN)

(72) Inventors: Ze Peng, Jinan (CN); Duan Zhang, Jinan (CN)

(73) Assignee: INSPUR ELECTRONIC INFORMATION INDUSTRY CO., LTD., Jinan (CN)

( * ) Notice: Subject to any disclaimer, the term of this patent is extended or adjusted under 35 U.S.C. 154(b) by 231 days.

(21) Appl. No.: 17/789,318

(22) PCT Filed: Aug. 25, 2020

(86) PCT No.: PCT/CN2020/110993
§ 371 (c)(1),
(2) Date: Jun. 27, 2022

(87) PCT Pub. No.: WO2021/128897
PCT Pub. Date: Jul. 1, 2021

(65) Prior Publication Data
US 2023/0035761 A1 Feb. 2, 2023

(30) Foreign Application Priority Data
Dec. 27, 2019 (CN) .......................... 201911379264.1

(51) Int. Cl.
*G06F 3/06* (2006.01)
(52) U.S. Cl.
CPC .......... *G06F 3/0659* (2013.01); *G06F 3/0604* (2013.01); *G06F 3/0653* (2013.01); *G06F 3/067* (2013.01)

(58) Field of Classification Search
None
See application file for complete search history.

(56) References Cited

U.S. PATENT DOCUMENTS 11,853,656 B1 * 12/2023 Naamad ................. G06F 30/20
2010/0312982 A1 * 12/2010 Ichikawa ............ G06F 9/45558
718/1

(Continued)

FOREIGN PATENT DOCUMENTS

CN 103106150 A 5/2013
CN 104035729 A 9/2014
(Continued)

OTHER PUBLICATIONS

International Search Report of corresponding PCT application (PCT/CN2020/110993) Dec. 7, 2020.
(Continued)

*Primary Examiner* — Rocio Del Mar Perez-Velez
*Assistant Examiner* — Marwan Ayash
(74) *Attorney, Agent, or Firm* — Crowell & Moring LLP

(57) ABSTRACT

A method, an apparatus, a device, and a medium for creating a thick-provisioned volume. The method includes: creating a thin volume; acquiring a current workload of a cluster; determining a volume filling thread quantity corresponding to the thin volume and a Quality of Service (QOS) policy based on the workload and a preset load threshold; filling the thin volume using a volume filling thread determined according to the volume filling thread quantity and the QOS policy, so as to complete the creation of a thick-provisioned volume. As such, determining the volume filling thread quantity and the QOS policy according to the current workload of the cluster and then filling the thin volume using the volume filling thread determined according to the volume filling thread quantity and the QOS policy so as to complete the creation of the thick-provisioned volume may (Continued)

reduce the influence of the creation of a thick-provisioned volume on core services of a cluster and thereby ensure the stability of the core services of the cluster.

12 Claims, 2 Drawing Sheets

(56) References Cited

U.S. PATENT DOCUMENTS

| | | | |
|---|---|---|---|
| 2015/0134928 A1* | 5/2015 | Goodman | G06F 3/0644 711/170 |
| 2015/0248241 A1 | 9/2015 | Goodman et al. | |
| 2016/0328435 A1* | 11/2016 | Kavanagh | G06F 16/1767 |
| 2018/0121100 A1 | 5/2018 | Auvenshine et al. | |
| 2019/0171397 A1* | 6/2019 | Patel | G06F 3/0685 |
| 2019/0369897 A1* | 12/2019 | Zhou | G06F 3/0608 |

FOREIGN PATENT DOCUMENTS

| | | |
|---|---|---|
| CN | 104461914 A | 3/2015 |
| CN | 1053789641 A | 3/2016 |
| CN | 105487826 A | 4/2016 |
| CN | 107800574 A | 3/2018 |
| CN | 108874320 A | 11/2018 |
| CN | 108881348 A | 11/2018 |
| CN | 109445716 A | 3/2019 |
| CN | 109739778 A | 5/2019 |
| CN | 111061435 A | 4/2020 |
| CN | 111176570 A | 5/2020 |

OTHER PUBLICATIONS

Written Opinion of International Searching Authority of corresponding PCT application (PCT/CN2020/110993) Dec. 7, 2020.
First Office Action of corresponding CN priority application (CN201911379264.1) Feb. 9, 2021.
Search report of corresponding CN priority application (CN201911379264.1) Feb. 3, 2021.
Supplementary search report of corresponding CN priority application (CN201911379264.1) Jun. 16, 2021.

* cited by examiner

CREATING THICK-PROVISIONED VOLUME ACCORDING TO A QUALITY OF SERVICE POLICY BASED ON THE WORKLOAD OF A CLUSTER

CROSS-REFERENCE TO RELATED APPLICATION

This application is the national phase application of International Application No. PCT/CN2020/110993, filed Aug. 25, 2020, which claims priority to Chinese Patent Application No. 201911379264.1, filed on Dec. 27, 2019, in China National Intellectual Property Administration and entitled "Method, Apparatus, Device, and Medium for Creating Thick-Provisioned Volume", the contents of each of which are hereby incorporated by reference in its entirety.

FIELD

The present application relates to the technical field of storage, and particularly to a method, an apparatus, a device, and a medium for creating a thick-provisioned volume.

BACKGROUND

Block storage is suitable for data storage in most service scenarios. A user may use block storage by performing formatting and creating any file system, like using a physical hard disk. Therefore, block storage is applied more and more extensively.

Currently, in a block storage scenario, volume is responsible for function realization and service output. Volume is mainly divided into two types: thin volume and thick-provisioned volume. However, the creation of a thick-provisioned volume needs a volume filling operation on a quota space. As a result, a plenty of resources of a cluster are occupied, core services of the cluster are affected.

SUMMARY

In view of this, an objective of the present application is to provide a method, an apparatus, a device, and a medium for creating a thick-provisioned volume, which may reduce the influence of the creation of a thick-provisioned volume on core services of a cluster and thereby ensure the stability of the core services of the cluster. Specific solutions are as follows.

In a first aspect, the present application discloses a method for creating a thick-provisioned volume, including:
creating a thin volume;
acquiring a current workload of a cluster;
determining a volume filling thread quantity corresponding to the thin volume and a Quality of Service (QOS) policy based on the workload and a preset load threshold;
filling the thin volume using a volume filling thread determined according to the volume filling thread quantity and the QOS policy, so as to complete the creation of a thick-provisioned volume.

Optionally, the acquiring a current workload of a cluster includes:
acquiring a current Input/Output Operations Per Second (IOPS) and bandwidth occupancy of the cluster.

Optionally, the determining a volume filling thread quantity corresponding to the thin volume and a QOS policy based on the workload and a preset load threshold includes:
determining a magnitude relationship between the workload and a first preset load threshold as well as a second preset load threshold;
determining the volume filling thread quantity corresponding to the thin volume and the QOS policy based on the magnitude relationship.

Optionally, the determining the volume filling thread quantity corresponding to the thin volume and the QOS policy based on the magnitude relationship includes:
when the magnitude relationship is that the workload is greater than the first preset load threshold, determining that the volume filling thread quantity is a first numerical value, and enabling a corresponding QOS policy, so as to limit an IOPS and bandwidth of the thin volume;
when the magnitude relationship is that the workload is less than the first preset load threshold and greater than the second preset load threshold, determining that the volume filling thread quantity is a second numerical value, and enabling a corresponding QOS policy, so as to limit the IOPS and bandwidth of the thin volume;
when the magnitude relationship is that the workload is less than the second preset load threshold, determining that the volume filling thread quantity is a third numerical value.

Optionally, further including:
determining the first preset load threshold, the second preset load threshold, the first numerical value, the second numerical value and the third numerical value according to performance of the current cluster.

Optionally, before the creating a thin volume, further including:
in response to acquiring a thick-provisioned volume creation instruction, triggering the step of creating a thin volume.

Optionally, further including:
during the creation of the thick-provisioned volume, triggering regularly the step of acquiring a current workload of a cluster, and adjusting the volume filling thread quantity and the QOS policy according to the acquired current workload.

In a second aspect, the present application discloses an apparatus for creating a thick-provisioned volume, including:
a thin volume creation module, configured to create a thin volume;
a cluster load acquisition module, configured to acquire a current workload of a cluster;
a volume resource determination module, configured to determine a volume filling thread quantity corresponding to the thin volume and a QOS policy based on the workload and a preset load threshold;
a volume data filling module, configured to fill the thin volume using a volume filling thread determined according to the volume filling thread quantity and the QOS policy, so as to complete the creation of a thick-provisioned volume.

In a third aspect, the present application discloses a device for creating a thick-provisioned volume, including a processor and a memory; wherein
the memory is configured to store a computer program;
the processor is configured to execute the computer program to implement the above-mentioned method for creating a thick-provisioned volume.

In a fourth aspect, the present application discloses a computer-readable storage medium, configured to store a computer program, wherein the computer program is executed by a processor to implement the above-mentioned method for creating a thick-provisioned volume.

It can be seen that, in the present application, a thin volume is created first, and then a current workload of a cluster is acquired, and a volume filling thread quantity corresponding to the thin volume and a QOS policy are determined based on the workload and a preset load threshold, and finally the thin volume is filled using a volume filling thread determined according to the volume filling thread quantity and the QOS policy, so as to complete the creation of a thick-provisioned volume. As such, determining the volume filling thread quantity and the QOS policy according to the current workload of the cluster and then filling the thin volume using the volume filling thread determined according to the volume filling thread quantity and the QOS policy so as to complete the creation of the thick-provisioned volume may reduce the influence of the creation of a thick-provisioned volume on core services of a cluster and thereby ensure the stability of the core services of the cluster.

BRIEF DESCRIPTION OF THE DRAWINGS

In order to describe the technical solutions in embodiments of the present application or the prior art more clearly, the drawings required to be used in descriptions about the embodiments or the prior art will be introduced briefly below. Apparently, the drawings in the description below are only the embodiments of the present application. Those ordinarily skilled in the art may further obtain other drawings according to the provided drawings without creative work.

DETAILED DESCRIPTION

The technical solutions in the embodiments of the present application will be described clearly and completely below in combination with the drawings in the embodiments of the present application. Clearly, the described embodiments are not all but only part of embodiments of the present application. All other embodiments obtained by those ordinarily skilled in the art based on the embodiments in the present application without creative work shall fall within the scope of protection of the present application.

Currently, in a block storage scenario, volume is responsible for function realization and service output. Volume is mainly divided into two types: thin volume and thick-provisioned volume. However, the creation of a thick-provisioned volume needs a volume filling operation on a quota space. As a result, plenty of resources of a cluster are occupied, and core services of the cluster are affected. To this end, the embodiment of the present application provides a solution to the creation of a thick-provisioned volume, which may reduce the influence of the creation of a thick-provisioned volume on core services of a cluster and thereby ensure the stability of the core services of the cluster.

Figure 1:
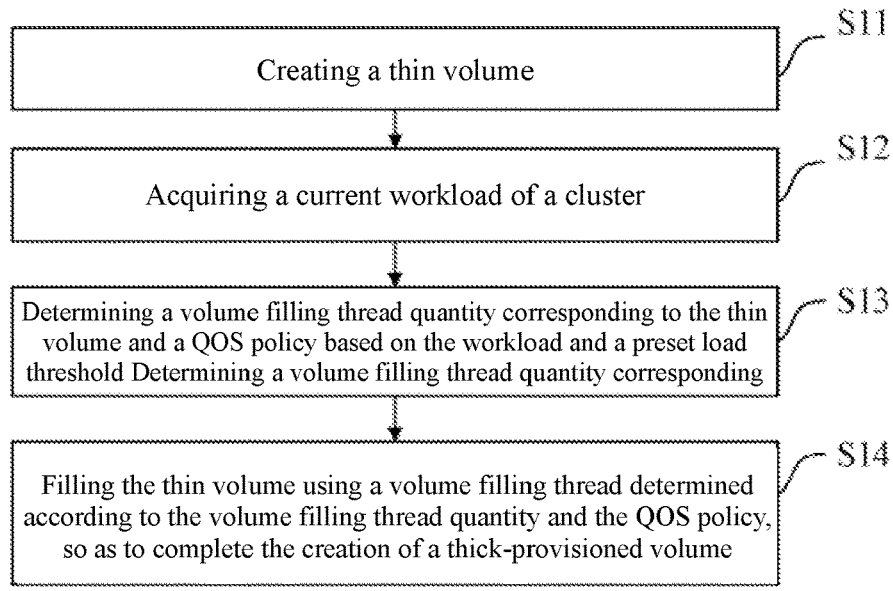
FIG. 1 is a flowchart of a method for creating a thick-provisioned volume according to the present application.

Referring to FIG. 1, an embodiment of the present application discloses a method for creating a thick-provisioned volume, including:

Step S11: creating a thin volume.

In a specific embodiment, in the present embodiment, a thin volume is created in response to acquiring a thick-provisioned volume creation instruction.

Step S12: acquiring a current workload of a cluster.

In a specific embodiment, in the present embodiment, a current IOPS and bandwidth occupancy of a cluster may be acquired.

Step S13: determining a volume filling thread quantity corresponding to the thin volume and a QOS policy based on the workload and a preset load threshold.

In a specific embodiment, a magnitude relationship between the workload and a first preset load threshold as well as a second preset load threshold is determined first, and then a volume filling thread quantity corresponding to the thin volume and a QOS policy are determined based on the magnitude relationship. Specifically, when the magnitude relationship is that the workload is greater than the first preset load threshold, it is determined that the volume filling thread quantity is a first numerical value, and a corresponding QOS policy is enabled, so as to limit an IOPS and bandwidth of the thin volume. When the current workload is greater than the first preset load threshold, it may be determined that the current cluster is relatively high in workload and service pressure. In such case, a relatively small volume filling thread quantity may be determined, and a corresponding QOS policy is enabled, so as to limit the IOPS and bandwidth of the thin volume. When the magnitude relationship is that the workload is less than the first preset load threshold and greater than the second preset load threshold, it is determined that the volume filling thread quantity is a second numerical value, and a corresponding QOS policy is enabled, so as to limit the IOPS and bandwidth of the thin volume. When the current workload is less than the first preset load threshold and greater than the second preset load threshold, it may be determined that the current cluster is in moderate service pressure. In such case, a corresponding volume filling thread quantity is determined, and a corresponding QOS policy is enabled, so as to limit the IOPS and bandwidth of the thin volume appropriately. when the magnitude relationship is that the workload is less than the second preset load threshold, it is determined that the volume filling thread quantity is a third numerical value, and it may be determined that the current cluster is relatively low in service pressure. In such case, a relatively large volume filling thread quantity may be determined so as to improve the concurrent write capability, and no corresponding QOS policy is set, so as to complete the creation of a thick-provisioned volume fast.

Moreover, in the present embodiment, the first preset load threshold, the second preset load threshold, the first numerical value, the second numerical value and the third numerical value may be determined according to performance of the current cluster. For example, the first numerical value is 2, the second numerical value is 8, and the third numerical value is 16. That is, the determination of the specific volume filling thread quantity considers both the current workload of the cluster and the performance of the cluster.

Step S14: filling the thin volume using a volume filling thread determined according to the volume filling thread quantity and the QOS policy, so as to complete the creation of a thick-provisioned volume.

In a specific embodiment, a volume filling thread is determined first according to the volume filling thread quantity. For example, if the determined volume filling thread quantity is 2, two volume filling threads are determined first. The two volume filling threads may be created. Then, the thin volume is filled using the two volume filling threads and a QOS policy. After volume data filling is completed, object-map of all objects is updated, so as to complete the creation of the thick-provisioned volume.

Moreover, the present embodiment may be implemented in a Rados Block Device (RBD) layer of a distributed storage system. When the RBD layer receives a creation instruction, the thin volume is created first, and then a write filling operation is performed on the thin volume, so as to complete the creation of the thick-provisioned volume.

It can be seen that, in the embodiment of the present application, a thin volume is created first; then, a current workload of a cluster is acquired, and a volume filling thread quantity corresponding to the thin volume and a QOS policy are determined based on the workload and a preset load threshold, finally the thin volume is filled using a volume filling thread determined according to the volume filling thread quantity and the QOS policy, so as to complete the creation of a thick-provisioned volume. As such, determining the volume filling thread quantity and the QOS policy according to the current workload of the cluster and then filling the thin volume using the volume filling thread determined according to the volume filling thread quantity and the QOS policy so as to complete the creation of the thick-provisioned volume may reduce the influence of the creation of a thick-provisioned volume on core services of a cluster and thereby ensure the stability of the core services of the cluster.

Figure 2:
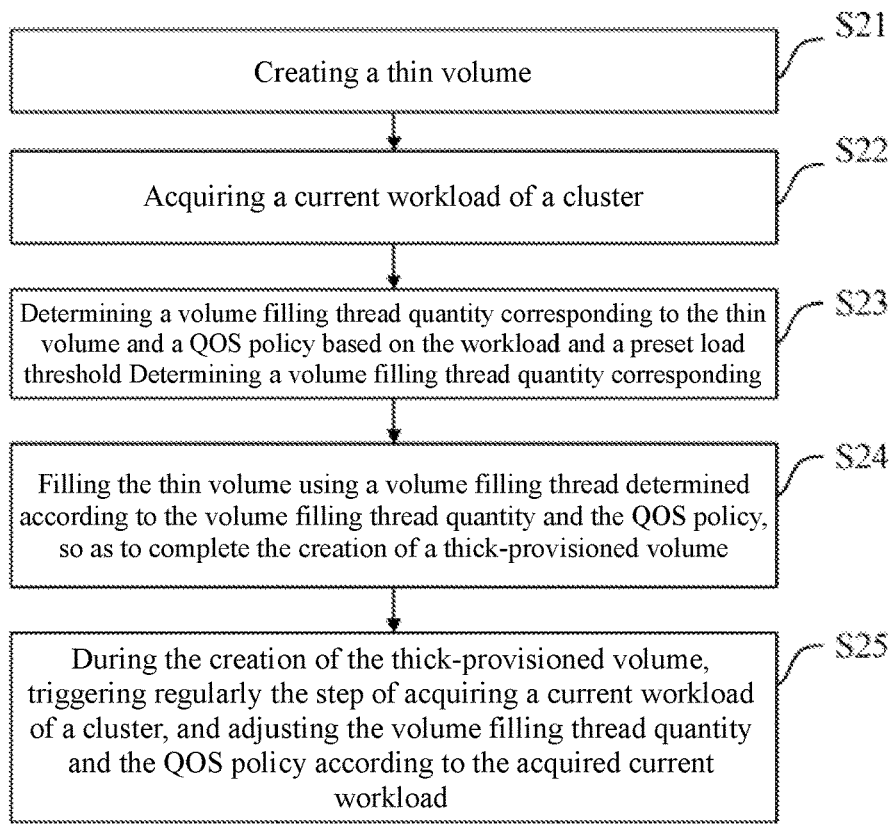
FIG. 2 is a flowchart of a specific method for creating a thick-provisioned volume according to the present application.

Referring to FIG. 2, an embodiment of the present application discloses a specific method for creating a thick-provisioned volume, including:

Step S21: creating a thin volume.

Step S22: acquiring a current workload of a cluster.

Step S23: determining a volume filling thread quantity corresponding to the thin volume and a QOS policy based on the workload and a preset load threshold.

Step S24, filling the thin volume using a volume filling thread determined according to the volume filling thread quantity and the QOS policy, so as to complete the creation of a thick-provisioned volume.

The specific process of steps S21 to S24 may refer to the corresponding contents disclosed in the above-mentioned embodiment, and will not be elaborated herein.

Step S25: during the creation of the thick-provisioned volume, triggering the step of acquiring a current workload of a cluster regularly, and adjusting the volume filling thread quantity and the QOS policy according to the acquired current workload.

In a specific embodiment, in the present embodiment, during the creation of the thick-provisioned volume, the step of acquiring a current workload of a cluster is triggered regularly, then a volume filling thread quantity corresponding to the thin volume and a QOS policy are determined based on the workload and the preset load threshold, and the thin volume is filled using a volume filling thread determined according to the volume filling thread quantity and the QOS policy. That is, in the present embodiment, during the creation of the thick-provisioned volume, the volume filling thread quantity and the QOS policy may be adjusted in real time according to the current workload, so as to implement the creation of the thick-provisioned volume. As such, the occupation of cluster resources by the creation of a thick-provisioned volume may be optimized.

Figure 3:
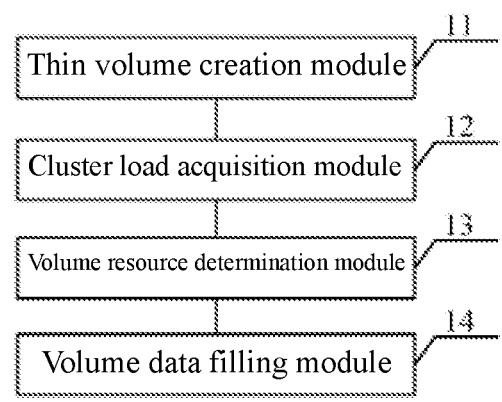
FIG. 3 is a schematic structural diagram of an apparatus for creating a thick-provisioned volume according to the present application.

Referring to FIG. 3, an embodiment of the present application discloses an apparatus for creating a thick-provisioned volume, characterized by including:

a thin volume creation module 11, configured to create a thin volume;

a cluster load acquisition module 12, configured to acquire a current workload of a cluster;

a volume resource determination module 13, configured to determine a volume filling thread quantity corresponding to the thin volume and a QOS policy based on the workload and a preset load threshold;

a volume data filling module 14, configured to fill the thin volume using a volume filling thread determined according to the volume filling thread quantity and the QOS policy, so as to complete the creation of a thick-provisioned volume.

It can be seen that, in the embodiment of the present application, a thin volume is created first; then, a current workload of a cluster is acquired, and a volume filling thread quantity corresponding to the thin volume and a QOS policy are determined based on the workload and a preset load threshold, finally, the thin volume is filled using a volume filling thread determined according to the volume filling thread quantity and the QOS policy, so as to complete the creation of a thick-provisioned volume. As such, determining the volume filling thread quantity and the QOS policy according to the current workload of the cluster and then filling the thin volume using the volume filling thread determined according to the volume filling thread quantity and the QOS policy so as to complete the creation of the thick-provisioned volume may reduce the influence of the creation of a thick-provisioned volume on core services of a cluster and thereby ensure the stability of the core services of the cluster.

The cluster load acquisition module 12 is specifically configured to acquire a current IOPS and bandwidth occupancy of the cluster.

The volume resource determination module 13 includes a load relationship determination submodule and a volume resource determination submodule. The load relationship determination submodule is configured to determine a magnitude relationship between the workload and a first preset load threshold as well as a second preset load threshold. The volume resource determination submodule is configured to determine, based on the magnitude relationship, the volume filling thread quantity corresponding to the thin volume and the QOS policy.

In a specific embodiment, the volume resource determination submodule is configured to, when the magnitude relationship determined by the load relationship determination submodule is that the workload is greater than the first preset load threshold, determine that the volume filling thread quantity is a first numerical value, and enable a corresponding QOS policy, so as to limit an IOPS and bandwidth of the thin volume; when the magnitude relationship determined by the load relationship determination submodule is that the workload is less than the first preset load threshold and greater than the second preset load threshold, determine that the volume filling thread quantity is a second numerical value, and enable a corresponding QOS policy, so as to limit the IOPS and bandwidth of the thin volume; when the magnitude relationship determined by the load relationship determination submodule is that the workload is less than the second preset load threshold, determine that the volume filling thread quantity is a third numerical value.

Moreover, the apparatus for creating a thick-provisioned volume further includes a parameter determination module, configured to determine the first preset load threshold, the second preset load threshold, the first numerical value, the second numerical value and the third numerical value according to performance of the current cluster.

The apparatus for creating a thick-provisioned volume further includes a creation instruction acquisition module, configured to, in response to acquiring a thick-provisioned volume creation instruction, trigger the step of creating a thin volume.

The apparatus for creating a thick-provisioned volume further includes a volume resource adjusting module, configured to, during the creation of the thick-provisioned volume, trigger regularly the step of acquiring a current workload of a cluster, and adjust the volume filling thread quantity and the QOS policy according to the acquired current workload.

Figure 4:
FIG. 4 is a structural diagram of a device for creating a thick-provisioned volume according to the present application.

Referring to FIG. 4, an embodiment of the present application discloses a device for creating a thick-provisioned volume, including a processor 21 and a memory 22; wherein the memory 22 is configured to store a computer program; the processor 21 is configured to execute the computer program to implement the following steps:

creating a thin volume; acquiring a current workload of a cluster; determining a volume filling thread quantity corresponding to the thin volume and a QOS policy based on the workload and a preset load threshold; filling the thin volume using a volume filling thread determined according to the volume filling thread quantity and the QOS policy, so as to complete the creation of a thick-provisioned volume.

It can be seen that, in the embodiment of the present application, a thin volume is created first; then, a current workload of a cluster is acquired, and a volume filling thread quantity corresponding to the thin volume and a QOS policy are determined based on the workload and a preset load threshold, finally, the thin volume is filled using a volume filling thread determined according to the volume filling thread quantity and the QOS policy, so as to complete the creation of a thick-provisioned volume. As such, determining the volume filling thread quantity and the QOS policy according to the current workload of the cluster and then filling the thin volume using the volume filling thread determined according to the volume filling thread quantity and the QOS policy so as to complete the creation of the thick-provisioned volume may reduce the influence of the creation of a thick-provisioned volume on core services of a cluster and thereby ensure the stability of the core services of the cluster.

In the present embodiment, the processor 21 may execute a computer subprogram stored in the memory 22 to specifically implement the following step: acquiring a current IOPS and bandwidth occupancy of the cluster.

In the present embodiment, the processor 21 may execute a computer subprogram stored in the memory 22 to specifically implement the following steps: determining a magnitude relationship between the workload and a first preset load threshold as well as a second preset load threshold; determining the volume filling thread quantity corresponding to the thin volume and the QOS policy based on the magnitude relationship.

In the present embodiment, the processor 21 may execute a computer subprogram stored in the memory 22 to specifically implement the following steps: when the magnitude relationship is that the workload is greater than the first preset load threshold, determining that the volume filling thread quantity is a first numerical value, and enabling a corresponding QOS policy, so as to limit an IOPS and bandwidth of the thin volume; when the magnitude relationship is that the workload is less than the first preset load threshold and greater than the second preset load threshold, determining that the volume filling thread quantity is a second numerical value, and enabling a corresponding QOS policy, so as to limit the IOPS and bandwidth of the thin volume; when the magnitude relationship is that the workload is less than the second preset load threshold, determining that the volume filling thread quantity is a third numerical value.

In the present embodiment, the processor 21 may execute a computer subprogram stored in the memory 22 to specifically implement the following step: determining the first preset load threshold, the second preset load threshold, the first numerical value, the second numerical value and the third numerical value according to performance of the current cluster.

In the present embodiment, the processor 21 may execute a computer subprogram stored in the memory 22 to specifically implement the following step: in response to acquiring a thick-provisioned volume creation instruction, triggering the step of creating a thin volume.

In the present embodiment, the processor 21 may execute a computer subprogram stored in the memory 22 to specifically implement the following step: during the creation of the thick-provisioned volume, triggering regularly the step of acquiring a current workload of a cluster, and adjusting the volume filling thread quantity and the QOS policy according to the acquired current workload.

Further, an embodiment of the present application also discloses a computer-readable storage medium, configured to store a computer program, wherein the computer program is executed by a processor to implement the following steps:

creating a thin volume; acquiring a current workload of a cluster; determining a volume filling thread quantity corresponding to the thin volume and a QOS policy based on the workload and a preset load threshold; filling the thin volume using a volume filling thread determined according to the volume filling thread quantity and the QOS policy, so as to complete the creation of a thick-provisioned volume.

It can be seen that, in the embodiment of the present application, a thin volume is created first; then, a current workload of a cluster is acquired, and a volume filling thread quantity corresponding to the thin volume and a QOS policy are determined based on the workload and a preset load threshold, finally, the thin volume is filled using a volume filling thread determined according to the volume filling thread quantity and the QOS policy, so as to complete the creation of a thick-provisioned volume. As such, determining the volume filling thread quantity and the QOS policy according to the current workload of the cluster and then filling the thin volume using the volume filling thread determined according to the volume filling thread quantity and the QOS policy so as to complete the creation of the thick-provisioned volume may reduce the influence of the creation of a thick-provisioned volume on core services of a cluster and thereby ensure the stability of the core services of the cluster.

In the present embodiment, a computer subprogram stored in the computer-readable storage medium may be executed by the processor to specifically implement the following step: acquiring a current IOPS and bandwidth occupancy of the cluster.

In the present embodiment, a computer subprogram stored in the computer-readable storage medium may be executed by the processor to specifically implement the following steps: determining a magnitude relationship between the workload and a first preset load threshold as well as a second preset load threshold; determining the volume filling thread quantity corresponding to the thin volume and the QOS policy based on the magnitude relationship.

In the present embodiment, a computer subprogram stored in the computer-readable storage medium may be executed by the processor to specifically implement the following steps: when the magnitude relationship is that the workload is greater than the first preset load threshold, determining that the volume filling thread quantity is a first numerical value, and enabling a corresponding QOS policy, so as to limit an IOPS and bandwidth of the thin volume; when the magnitude relationship is that the workload is less than the first preset load threshold and greater than the second preset load threshold, determining that the volume filling thread quantity is a second numerical value, and enabling a corresponding QOS policy, so as to limit the IOPS and bandwidth of the thin volume; when the magnitude relationship is that the workload is less than the second preset load threshold, determining that the volume filling thread quantity is a third numerical value.

In the present embodiment, a computer subprogram stored in the computer-readable storage medium may be executed by the processor to specifically implement the following step: determining the first preset load threshold, the second preset load threshold, the first numerical value, the second numerical value and the third numerical value according to performance of the current cluster.

In the present embodiment, a computer subprogram stored in the computer-readable storage medium may be executed by the processor to specifically implement the following step: in response to acquiring a thick-provisioned volume creation instruction, triggering the step of creating a thin volume.

In the present embodiment, a computer subprogram stored in the computer-readable storage medium may be executed by the processor to specifically implement the following step: during the creation of the thick-provisioned volume, triggering regularly the step of acquiring a current workload of a cluster, and adjusting the volume filling thread quantity and the QOS policy according to the acquired current workload.

Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively briefly, and related parts refer to part of descriptions about the method.

The steps of the method or algorithm described in combination with the embodiments disclosed herein may directly be implemented by hardware, a software module executed by the processor, or a combination thereof. The software module may be arranged in a Random Access Memory (RAM), a memory, a Read-Only Memory (ROM), an electrically programmable ROM, an electrically erasable programmable ROM, a register, a hard disk, a removable disk, a Compact Disc Read-Only Memory (CD-ROM), or a storage medium in any other form well known in this art.

The method, the apparatus, the device, and the medium for creating a thick-provisioned volume, and medium in the present application are introduced above in detail. The principle and embodiments of the present application are described herein with specific examples. The above descriptions about the embodiments are only for helping in understanding the method of the present application and the core concept thereof. In addition, those ordinarily skilled in the art may make variations to the specific embodiments and the scope of application according to the concept of the present application. In summary, the contents of the specification should not be understood as limitations on the present application.

What is claimed is:

1. A method for creating a thick-provisioned volume, comprising:
    acquiring, by a Rados Block Device (RBD) layer of a distributed storage system, a thick-provisioned volume creation instruction for creating a thick-provisioned volume, and triggering a step of creating a thin volume, wherein the thick-provisioned volume requires a volume filling operation on a quota space and consumes cluster resources compared to the thin volume;
    acquiring a current workload of a cluster;
    determining a volume filling thread quantity corresponding to the thin volume and a Quality of Service (QOS) policy based on the workload and a preset load threshold; and
    concurrently writing the thin volume using volume filling threads determined according to the volume filling thread quantity and enabling a corresponding QOS policy to limit an Input/Output Operations Per Second (IOPS) and bandwidth of the thin volume, so as to create the thick-provisioned volume;
    wherein the determining the volume filling thread quantity corresponding to the thin volume and the QOS policy based on the workload and the preset load threshold comprises:
    determining a first preset load threshold, a second preset load threshold, a first numerical value, a second numerical value and a third numerical value according to performance of the current cluster, wherein the first numerical value, the second numerical value and the third numerical value are multiple numbers of the volume filling threads, the first numerical value is smaller than the second numerical value, and the second numerical value is smaller than the third numerical value;
    in response to a determination that the workload is greater than the first preset load threshold, determining that the volume filling thread quantity is the first numerical value, and enabling a corresponding QOS policy, so as to limit the IOPS and bandwidth of the thin volume;
    in response to a determination that the workload is less than the first preset load threshold and greater than the second preset load threshold, determining that the volume filling thread quantity is the second numerical value, and enabling a corresponding QOS policy, so as to limit the IOPS and bandwidth of the thin volume; and
    in response to a determination that the workload is less than the second preset load threshold, determining that the volume filling thread quantity is the third numerical value.

2. The method for creating a thick-provisioned volume according to claim 1, wherein the acquiring a current workload of a cluster comprises:
    acquiring a current Input/Output Operations Per Second (IOPS) and bandwidth occupancy of the cluster.

3. The method for creating a thick-provisioned volume according to claim 1, further comprising:

during the creation of the thick-provisioned volume, triggering regularly the step of acquiring a current workload of a cluster, and adjusting the volume filling thread quantity and the QOS policy according to the acquired current workload.

4. A device for creating a thick-provisioned volume, comprising a processor and a storage, wherein
the storage is configured to store a computer readable instruction;
the processor is configured to execute the computer readable instruction to implement the method for creating a thick-provisioned volume comprising:
in response to a Rados Block Device (RBD) layer of a distributed storage system acquiring a thick-provisioned volume creation instruction for creating a thick-provisioned volume, triggering a step of creating a thin volume, wherein the thick-provisioned volume requires a volume filling operation on a quota space and consumes cluster resources compared to the thin volume;
acquiring a current workload of a cluster;
determining a volume filling thread quantity corresponding to the thin volume and a QOS policy based on the workload and a preset load threshold; and
concurrently writing the thin volume using volume filling threads determined according to the volume filling thread quantity and enabling a corresponding QOS policy to limit an Input/Output Operations Per Second (IOPS) and bandwidth of the thin volume, so as to create the thick-provisioned volume;
wherein the determining the volume filling thread quantity corresponding to the thin volume and the QOS policy based on the workload and the preset load threshold comprises:
determining a first preset load threshold, a second preset load threshold, a first numerical value, a second numerical value and a third numerical value according to performance of the current cluster, wherein the first numerical value, the second numerical value and the third numerical value are multiple numbers of the volume filling threads, the first numerical value is smaller than the second numerical value, and the second numerical value is smaller than the third numerical value;
in response to a determination that the workload is greater than the first preset load threshold, determining that the volume filling thread quantity is the first numerical value, and enabling a corresponding QOS policy, so as to limit the IOPS and bandwidth of the thin volume;
in response to a determination that the workload is less than the first preset load threshold and greater than the second preset load threshold, determining that the volume filling thread quantity is the second numerical value, and enabling a corresponding QOS policy, so as to limit the IOPS and bandwidth of the thin volume; and
in response to a determination that the workload is less than the second preset load threshold, determining that the volume filling thread quantity is the third numerical value.

5. A non-transitory computer-readable storage medium, configured to store a computer program, wherein the computer program is executed by a processor to implement the method for creating a thick-provisioned volume comprising:
in response to a Rados Block Device (RBD) layer of a distributed storage system acquiring a thick-provisioned volume creation instruction for creating a thick-provisioned volume, triggering a step of creating a thin volume, wherein the thick-provisioned volume requires a volume filling operation on a quota space and consumes cluster resources compared to the thin volume;
acquiring a current workload of a cluster;
determining a volume filling thread quantity corresponding to the thin volume and a QOS policy based on the workload and a preset load threshold; and
concurrently writing the thin volume using volume filling threads determined according to the volume filling thread quantity and enabling a corresponding QOS policy to limit an Input/Output Operations Per Second (IOPS) and bandwidth of the thin volume, so as to create the thick-provisioned volume;
wherein the determining the volume filling thread quantity corresponding to the thin volume and the QOS policy based on the workload and the preset load threshold comprises:
determining a first preset load threshold, a second preset load threshold, a first numerical value, a second numerical value and a third numerical value according to performance of the current cluster, wherein the first numerical value, the second numerical value and the third numerical value are multiple numbers of the volume filling threads, the first numerical value is smaller than the second numerical value, and the second numerical value is smaller than the third numerical value;
in response to a determination that the workload is greater than the first preset load threshold, determining that the volume filling thread quantity is the first numerical value, and enabling a corresponding QOS policy, so as to limit the IOPS and bandwidth of the thin volume;
in response to a determination that the workload is less than the first preset load threshold and greater than the second preset load threshold, determining that the volume filling thread quantity is the second numerical value, and enabling a corresponding QOS policy, so as to limit the IOPS and bandwidth of the thin volume; and
in response to a determination that the workload is less than the second preset load threshold, determining that the volume filling thread quantity is the third numerical value.

6. The method for creating a thick-provisioned volume according to claim 2, further comprising:
during the creation of the thick-provisioned volume, triggering regularly the step of acquiring a current workload of a cluster, and adjusting the volume filling thread quantity and the QOS policy according to the acquired current workload.

7. The method for creating a thick-provisioned volume according to claim 1, further comprising: during the creation of the thick-provisioned volume, triggering regularly the step of acquiring a current workload of a cluster, and adjusting the volume filling thread quantity and the QOS policy according to the acquired current workload.

8. The method for creating a thick-provisioned volume according to claim 1, further comprising: during the creation of the thick-provisioned volume, triggering regularly the step of acquiring a current workload of a cluster, and adjusting the volume filling thread quantity and the QOS policy according to the acquired current workload.

9. The method for creating a thick-provisioned volume according to claim 1, further comprising: during the creation of the thick-provisioned volume, triggering regularly the step of acquiring a current workload of a cluster, and adjusting the volume filling thread quantity and the QOS policy according to the acquired current workload.

10. The method for creating a thick-provisioned volume according to claim 1, further comprising: during the creation of the thick-provisioned volume, triggering regularly the step of acquiring a current workload of a cluster, and adjusting the volume filling thread quantity and the QOS policy according to the acquired current workload.

11. The device for creating a thick-provisioned volume according to claim 4, wherein the acquiring a current workload of a cluster comprises:
   acquiring a current IOPS and bandwidth occupancy of the cluster.

12. The device for creating a thick-provisioned volume according to claim 4, further comprising:
   during the creation of the thick-provisioned volume, triggering regularly the step of acquiring a current workload of a cluster, and adjusting the volume filling thread quantity and the QOS policy according to the acquired current workload.

\* \* \* \* \*